United States Patent [19]

Králíček et al.

[11] 3,919,175

[45] Nov. 11, 1975

[54] METHOD OF ANIONIC POLYMERIZATION AND COPOLYMERIZATION OF LACTAM OF ω-AMINOCARBOXYLIC ACIDS

[75] Inventors: Jaroslav Králíček, Prague; Vladimir Kubánek, Kralupy Nad Vltavou; Jaroslava Kondelíková, Prague, all of Czechoslovakia

[73] Assignee: Vysoka skola chemicko-technologicka, Prague, Czechoslovakia

[22] Filed: Jan. 19, 1973

[21] Appl. No.: 325,088

[30] Foreign Application Priority Data
Jan. 14, 1972  Czechoslovakia ............... 276-72

[52] U.S. Cl. ........ 260/78 L; 260/78 P; 260/448 AD
[51] Int. Cl.² ........................................ C08G 69/20
[58] Field of Search .......... 260/78 L, 78 P, 448 AD

[56] References Cited
UNITED STATES PATENTS 3,236,817  2/1966  Zimmerman ..................... 260/78 L
3,526,604  9/1970  Wadsworth ..................... 260/78 L X
3,772,253  11/1973  Brassat ............................... 260/78 L

*Primary Examiner*—Lucille M. Phynes

[57] ABSTRACT

Method of anionic polymerization and copolymerization of lactams of ω-aminocarboxylic acids, wherein alkali metal alkoxyhydroaluminates are used as basic catalysts, with or without usual activators. Alkali metal alkoxyhydroaluminates (complex alkoxyhydrides of aluminium and alkali metal) posses the general formula $$Me\ Al\ H_aZ_{4-a}$$

wherein Me is an alkali metal atom, $a$ is an integer ranging from 0 to 3 and Z is a group $-O-A-X-R_m$ or $-C-R$, R being a lower alkyl, A being $-CR^1R^2-(CH_2)_n-$, $R^1$ and $R^2$ standing for either a hydrogen atom or a methyl group, $n$ being an integer ranging from 2 to 6 and X standing for oxygen, sulphur or nitrogen, and $m$ being 1 in case of oxygen and sulphur and 2 in case of nitrogen. Said complex alkoxyhydroaluminates are capable of forming alkali metal salts of lactams and the respective lactams anions.

1 Claim, No Drawings

METHOD OF ANIONIC POLYMERIZATION AND COPOLYMERIZATION OF LACTAM OF ω-AMINOCARBOXYLIC ACIDS

BACKGROUND OF THE INVENTION

The present invention relates to a method of anionic polymerization of lactams of ω-aminocarboxylic acids using the above mentioned alkali metal alkoxyhydroaluminates as basic catalysts, said catalysts having considerable advantages.

Anionic polymerization of lactams using strong bases such as sodium salt of the respective lactam is well known. The initial growth centre is formed by lactam anion or by its complex with an activator.

A pre-requisite for a preproducible course of anionic polymerization and copolymerization of ω-aminocarboxylic acid lactams is, besides of absence of water and other inibitors, the use of sufficiently active catalysts, i.e. alkali metal salts of the lactams. Activated anionic polymerization of lactams involves, moreover, the addition of activators, which are usually compounds with N-alkyl-, or N,N-diacylamino structure, or compounds capable of forming said structures in situ. These structures form growth-centres of polymer chains. The main effort of the research in last 15 years was devoted to the activators, while the preparation of the catalysts themselves, i.e. of the alkali metal salts of lactams, remained — with rare exceptions — principally unchanged in comparison with the state of the first discovery.

Generally, alkali metal lactam salts may be prepared by reacting dry lactam with a strong base capable of forming the respective anion

The addition of this anion onto an endocyclic carbonyl group of an N-acyl lactam group, which either was formed in the reaction mixture or added, results in growth centres for the polyamide. As strong bases many substances may be used such as alkali metals, their hydrides or complex hydrides with aluminium such as NaAlH$_4$, alkali metal hydroxides, amides, alcoholates of alkali or alkali-earth metals, Grignard compounds, organometallic compounds, alkali metal salts of carboxylic acids which are decarboxylized at high temperatures liberating C-anions or N-anions, or also alkali metal salts of weak volatile acids or of acids liberating free strong bases by other reactions than decarboxylization. Besides of said catalysts, there were mentioned also others such as hydrated metal oxides and similar, which, however, have found no significant use in the practice.

Alkali metal salts of the above mentioned substances may be prepared in various ways, some of which being too complicated for technological use and thus too expensive and difficult. Inconvenient and dangereous is also the handling of many substances such as pure alkali metals, their hydrides and complex hydrides, amides and organometallic compounds, particularly in the conditions of a large scale production. The main shortcoming of said substances in industrial use is, however, the fact that the forming of the desired activators is accompagnied by various side reactions making the attaining of reproducinble high quality almost impossible. If the lactam salts are prepared from hydroxides or alcoholates of alkali or alkali-earth metals, the liberated water or alcohol has to be removed by distillation together with the first fraction of the lactam in order to avoid the de-activation by the hydrolysis of the growth centres in the following stage of the reaction. The distillation requires a rather complex equipment and cause considerable losses of the lactam. The removal of water may be achieved also azeotropically, or also by leading a stream of an inert gas through the molten lactam. Considerable progress simplifying the removal of water formed by the neutralization of hydroxides with lactams, was achieved by using molecular sieves according to the Czechoslovak Pat. No. 140,937.

SUMMARY OF THE INVENTION

Present invention covers a method of anionic polymerization and copolymerization of ω-aminocarboxylic acid lactams, wherein as catalysts are used plain or modified alkali metal alkoxyhydroaluminates of the general formula

wherein Me is an alkali metal atom, a is an integer ranging from 1 to 3 and Z is a group —O—A—X—R$_m$ or —O—R, R being a lower alkyl, A being —OR$^1$—R$^2$—(CH$_2$)$_n$—, R$^1$ and R$^2$ standing for either a hydrogen atom or a methyl group, $n$ being an integer ranging from 2 to 6 and X standing for oxygen, sulphur ($m = 1$) or nitrogen atom ($m = 2$), said alkoxyhydroaluminates being capable of forming alkali metal salts of lactams or the respective anions. The preparation of said complex alkoxyhydroaluminates (complex alkoxyhydrides of aluminium and alkali metals) was disclosed in U.S. Pat. Nos. 3,652,622 and 3,507,895 and in several papers.

Said compounds are known as effective reducing agents capable of reducing also amidic groups in both cyclic and linear amides and polyamides, whereat compounds inhibiting anionic polymerization are formed. It was therefore surprising to find that polymerization mixtures of lactams prepared with said complex alkoxyhydroaluminates display a very high polymerization activity. In comparison with the known methods the present method has several important advantages.

DESCRIPTION OF THE PREFERRED EMBODIMENTS

One important advantage is the ability of complex alkoxyhydroaluminates to bind water, accompanying often in low concentrations lactams, particularly the lower ones. The binding of such traces of water results in no reaction products which could adversely affect the polymerization. Thus, it is possible to prepare the polymerization mixture from usually packaged 6-caprolactam, which was distilled, granulated and put into polyethylene bags, without special re-distillation or other methods of removing traces of humidity, usual in other processes. Even under such simplified conditions the polymerization activity is practically equal to the quality of a mixture prepared directly from the equivalent amount of pure alkali metal lactam salt. Lower requirements concerning the anhydrous condition make themselves apparent during the polymerization process, particularly in manufacturing polyamide castings.

The method of the invention may be used for polymerizing and copolymerizing all lactams having the general formula -continued

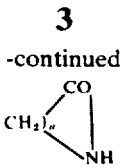

wherein $n$ is an integer ranging from 2 to 14, as well as their C-alkyl or C-aryl derivatives. Examples are 2-pyrrolidone, 6-caprolactam, γ-methylcaprolactam, ε-cyclohexyl- or ε-methylcaprolactam, α-methylcaprolactam, 7-oenantholactam, 8-caprylolactam, 12-laurolactam and others. It is also easy to prepare reaction mixtures for copolymerizing various lactams.

Another advantage of the catalysts of the invention is the easiness with which the polymerization mixtures are prepared. Complex alkoxyhydroaluminates may be added into the lactams either in solid crystalline state, or, still better, in the form of concentrated solutions in inert solvents, particularly in aromatic hydrocarbons such as in benzene or toluene. Such concentrated about 60 to 70% solutions are on the market as special reducing agents and are not self-igniting. They may be very conveniently metered. The solvents need not to be removed because their amount is very low.

The catalysts of the invention are used in roughly equal amounts like the bases applied in methods of anionic polymerization of lactams known hitherto. The usual range of concentration lies between 0.1 and $2.10^{-2}$ mol for 1 mol of lactam. It is, of course, possible to use even higher concentrations, especially at higher humidity of the starting material.

The catalysts of the invention are very easily soluble in molten lactams due to the organic substituent in the molecule of the complex hydride. In this respect they are also mostly superior to other catalysts.

Another advantage of the invention consists in lower sensitivity of the catalyst to the humidity. Thus, the requirements concerning the dryness of the inert atmosphere are less critical than usually.

The catalysts of the invention may be either metered into the melt of the respective lactam, or also they may be added to crystalline lactams before melting. Mixtures of lactams with complex alkoxyhydrides of aluminium and alkali metals are very stable and may be kept at room temperature for a very long time, e.g. in sealed tins. Such mixtures can be used also by customers having no chemical laboratory, which is another advantage of the invention. After having heated the container to the required temperature above the melting point of the respective lactam or lactam mixture the activator is stirred into the melt which may be then immediately poured into a preheated mold. Since the activator is usually a stable, non-inflammable substance, the set may be used as simply as e.g. commercial epoxide cements. The castings are smooth and free of cavities or bubbles.

The method of the invention is illustrated by following non-limitative Examples.

EXAMPLE 1

1 ml of a 65.5 % solution of sodium bis-methoxyethoxyaluminium dihydride of the formula $NaAlH_2—(O—CH_2—CH_2—O—CH_3)_2$ in benzene was stirred under a stream of nitrogen into 1 mol of dry molten 6-caprolactam at 85°C. The melt was homogenized by stirring vigorously for 15 minutes, the temperature being kept at 135°C. At the same temperature $3.10^{-3}$ mol of N-acetylcaprolactam was added while stirring steadily. The half-time of polymerization in adiabatic arrangement was 9.5 minutes, the conversion attained 97.5 %. Tensile strength of the polymer thus obtained was 10 % higher than that of usual polymer prepared with sodium salt of caprolactam as catalyst.

EXAMPLE 2

0.5 mol of non-distilled 12-laurolactam, molten in a stainless steel polymerization reactor, was mixed under vigorous stirring with $3.10^{-3}$ mol of complex hydride of the formula

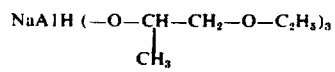

dissolved in 2 ml of anhydrous benzene and added dropwise at 160°C. To the homogenized mixture $2.10^{-3}$ mol of N-benzoylcaprolactam was added. The half-time of polymerization was 15 minutes, the conversion degree 99%.

EXAMPLE 3

0.5 mol of anhydrous 8-caprylolactam, dried by means of molecular sieve (Registered Trade Mark Nalsite 4A) in a polymerization vessel at 110°C was mixed first with $2.5 . 10^{-3}$ mol of complex hydride of the formula $NaAl H(—O—CH_2.CH_2—(CH_3)_2)_3$ and then with $2.5 . 10^{-3}$ mol of N-acetylcaprolactam. The reaction mixture was homogenized 30 seconds by stirring vigorously. The half-time of polymerization was 12.5 min, the degree of conversion reached 98.5%.

EXAMPLE 4

$5.10^{-3}$ mol of complex hydride of the formula $NaAlH(—O—CH_2—CH_2—O—C_2H_5)_3$ was added under a rather strong stream of dry nitrogen to a solid mixture of 0.5 mol of 6-caprolactam and 0.5 mol of 8-caprylolactam, said lactams having not been previously dried. The mixture was then melted and homogenized by vigorous stirring for 20 minutes. The melt was then kept at 135°C in a bath of the same temperature and $5.10^{-3}$ mol of 2,4-naphthalene diisocyanate was added. The half-time of polymerization was 15 minutes, the degree of conversion 97%.

EXAMPLE 5

2 mol of industrial purity grade 6-caprolactam were melted in a stainless steel reactor in adiabatic arrangement at 80°C under dry nitrogen. Then $5.10^{-3}$ mol of complex hydride of the formula $NaAlH_2 [—O—CH_2C-H_2O—CH(CH_3)_2]_2$ was added. After increasing the temperature to 136°C there was added $5.10^{-3}$ mol of N-acetyl caprolactam. The half-time of polymerization was 12 minutes, the conversion degree attained 96.5%. The notch toughness of the polyamide was 5.4 Kp/cm², while a standard sample attained only 4.1.

EXAMPLE 6

10 mols of 6-caprolactam (industrial grade) was heated without drying to 135°C. 10 ml of a 63% benzene solution of complex hydride of the formula $NaAlH_2(—O—CH_2CH_2O—CH_3)_2$ and 0.03 mol of N-benzoyl caprolactam were added while stirring. The polymerization was carried out under air with relative humidity of 41% and lasted 17 minutes; the half-time of polymerization was 12 minutes. The polyamide thus obtained contained 4.5% of water-soluble extract. Its intrinsic viscosity in cresol was 2.5.

EXAMPLE 7

1.5 mol of powdered 6-caprolactam (industrial grade) was mixed at room temperature with $5.10^{-3}$ mol of crystalline sodium dihydro-bis-2-methoxyethoxy aluminate of the formula $NaAlH_2(-O-CH_2-CH_2-O-CH_3)_2$. The mixture was kept in a 1000 ml sealed tin for 7 months. Thereafter the mixture was melted and the tin opened. $5.10^{-3}$ mol of N-acetyl caprolactam was added at 135°C and the homogenized mixture was poured into a mold pre-heated to 155°C. After 60 minutes the polymerization and crystallization was finished and the casting was removed from the mold. The conversion attained 97%, the average degree of polymerization was 380.

The above described polymerization catalysts may be used in combination with any kind of activators, or also without activators. In the latter case, the temperature and the time of polymerization have to be increased accordingly.

What we claim is:

1. A method of anionically polymerizing at least one lactam of an omega-aminocarboxylic acid to a moldable polymer, wherein as catalysts are used alkali metal alkoxyhydroaluminates of the general formula $$Me\ AL\ H_a Z_{(4-m)}$$

Me being an alkali metal atom, a being an integer ranging from 0 to 3 and Z being a group $-O-A-X-R_m$ or $-O-R$, wherein R is a lower alkyl, A is $-CR^1R^2-(CH_2)_n-$, $R^1$ and $R^2$ standing for either a hydrogen atom or a methyl group, $n$ being an integer ranging from 2 to 6, X being either oxygen, sulphur or nitrogen, and $m$ being 1 if X is either oxygen or sulphur, and 2 if X is nitrogen.

* * * * *